United States Patent Office 3,520,706
Patented July 14, 1970

3,520,706
METHOD OF MAKING MAGNESITE BRICK
Ben Davies, George F. Carini, and Ernest P. Weaver, Pittsburgh, Pa., assignors to Dresser Industries, Inc., Dallas, Tex., a corporation of Delaware
No Drawing. Continuation-in-part of application Ser. No. 661,192, Aug. 17, 1967. This application Oct. 26, 1967, Ser. No. 678,190
Int. Cl. C04b 35/04, 35/48
U.S. Cl. 106—57                                    5 Claims

ABSTRACT OF THE DISCLOSURE

Method of making magnesite brick comprising preparing a batch of synthetic magnesite having a $CaO:SiO_2$ ratio in excess of 2:1 and at least 0.5% of zircon to provide the calcium-magnesium-silicate matrix with a $CaO:SiO_2$ ratio between 2:1 and 1.7:1 after burning in excess of 2800° F.

RELATED CASES

This case is a continuation-in-part of application Ser. No. 661,192, filed Aug. 17, 1967, entitled "Method of Making Magnesite Brick."

BACKGROUND

The trend in the new basic oxygen steelmaking has been toward larger and larger steelmaking vessels. The trend has put great demands on refractories for lining the vessels. Many large vessels (that is, those exceeding 150 tons capacity) are partially lined with burned, tar-impregnated, magnesite brick which is, itself a recent development. This invention relates to an improved method of manufacturing magnesite and tar-impregnated magnesite brick.

Magnesite brick are refractory brick manufactured substantially or entirely of dead burned magnesite. Dead burned magnesite is the granular product obtained by burning or firing magnesite ($MgCO_3$) or other substances convertible to magnesia (MgO), upon heating, above about 3500° F. long enough to form dense, hydration-resistant granules. For convenience, those practiced in the art frequently refer to dead burned magnesite merely as "magnesite."

Magnesites are known as natural or synthetic. Natural magnesites are products obtained by treating naturally occurring mineral ores such as magnesite, breunnerite, or brucite. Synthetic magnesites are those that are obtained by precipitating the magnesian values from sea waters and brines. This invention concerns the manufacture of magnesite refractories from natural and synthetic magnesites, brick made from very pure synthetic magnesites with lime:silica mole ratios slightly above or below 2:1 have very excellent refractoriness and boron oxide contents less than 0.05% but, unfortunately, are somewhat difficult to manufacture. At normal burning temperatures, no accessory minerals melt, so that only solid-state sintering occurs—which is very slow as compared to sintering in the presence of a liquid phase. A method of making magnesite brick has now been discovered whereby they can be made from high-purity synthetic magnesite with the small addition of a zircon mineral which greatly increases the rate of sintering without destroying the ultimate refractoriness of the brick.

Other workers have suggested the use of two component batches. For example, Lathe, in U.S. Pat. No. 2,621,131, attempts to form large amounts of liquids which will be present over an extended period of time during the firing process by combining refractory and nonrefractory components in a batch. To accomplish this, Lathe keeps the nonrefractory liquid-forming component and the refractory component in different size fractions of the batch so that they will not react immediately to form refractory compounds. Unfortunately, liquids present during burning are very detrimental in commercial production of refractories. They cause warping and sagging of the brick during the burning process. Furthermore, large additions to provide liquid formation according to the Lathe conception are inconsistent with current requirements of high purity.

Lee, in U.S. Pat. No. 2,292,644, suggests the addition of calcareous materials to a magnesite brick batch comprising a magnesite-containing merwinite to raise the lime:silica ratio and, hence, provide a more refractory matrix phase. This permits dead burning the magnesite grains at lower temperatures. This procedure is undesirable as the coarse fractions contain a low-melting phase which is not easily reacted with the calcareous addition.

Good et al., in U.S. Pat. No. 3,192,059, teach the manufacture of magnesite-zircon brick made from batches comprising at least 10% zircon.

BRIEF DESCRIPTION OF THE INVENTION

According to this invention, magnesite brick are made by first forming a batch of size graded, dead burned magnesite having a lime:silica weight ratio between 2:1 and 5:1 and at least 0.5% and less than 5%, by weight, of the total batch finely divided zircon ($ZrO_2 \cdot SiO_2$). Magnesites with lime:silica ratios exceeding 5:1 are very difficult to use in the manufacture of brick because of their hydration tendencies. The finely divided zircon and the magnesite are balanced such that the lime:silica weight ratio in the calcium-magnesium-silicate matrix phase is between 2:1 and 1.6:1. In other words, the lime which becomes part of a calcium metazirconate is not considered in calculating the lime:silica ratio. Preferably, this $CaO:SiO_2$ ratio is between 1.8:1 and 1.7:1. The batch should essentially analyze less than 3.0% of $R_2O_3$ oxides ($Al_2O_3$, $Fe_2O_3$, $Cr_2O_3$), less than 0.5% $TiO_2$, less than 0.5% $Al_2O_3$, less than 0.05% $B_2O_3$, and at least about 90% MgO. Preferably, the $B_2O_3$ is less than 0.02%. The batch is thereafter tempered with a suitable binder such as lignosulfonate liquor. The tempered batch is formed into brick, for example, at pressures exceeding about 8000 p.s.i. The brick are thereafter dried at about 250° F. for about 10 hours. The dried brick are burned in excess of 2800° F.

DETAILED DESCRIPTION

Further features and other objects and advantages of this invention will become clearer to those skilled in the art by careful study of the following detailed description. In the detailed description, all percentages, ratios, and parts are by weight; chemical analyses were obtained by spectrographic analysis with control by wet chemical analysis; and are reported as oxides in accordance with the present practice of the refractories industry. All sizings are measured with Tyler Standard Screen Scale Sieve Series sieves.

The invention will be described further in relationship to the following examples, in which the details are given by way of illustration and not by way of limitation.

Dead burned magnesite, made synthetically from brine, was used in the following examples. It analyzed approximately 0.70% silica, 2.40% lime, 0.25% $Fe_2O_3$, 0.35% $Al_2O_3$, and less than 0.02% $B_2O_3$. This magnesite was crushed and sized to a screen analysis in weight percent as follows:

|  | Percent |
|---|---|
| −4+10 mesh | 30 |
| −10+28 mesh | 35 |
| Ball milled fines, −65 mesh | 35 |
| (40 to 60% of −65 mesh being −325 mesh) | |

The size graded magnesite was used to prepare brick-making batches. Additions of 1.1, 1.3, 1.5, and 2.1%, by weight, zircon were made to the batches of Examples I, II, III, and IV, respectively. The additions were finely divided, that is, less than 65 mesh. About 5% of a temporary binder comprising lignosulfonate liquor was added to the batches in a muller-type mixer. Thereafter, the batch was pressed into brick at about 8000 p.s.i., dried, and fired at about 3150° F. with a 10 hour hold at maximum temperature.

By way of comparison, Example V was prepared in the same manner as the foregoing examples but without any zircon additions. It was prepared from a grain having a lime:silica ratio of 1.68:1.

TABLE I

| Example | I | II | III | IV | V |
|---|---|---|---|---|---|
| Bulk Density, pcf, ¹ | 189 | 189 | 189 | 189 | 183 |
| Modulus of rupture, p.s.i.: | | | | | |
| At room temperature ² | 3,910 | 3,660 | 4,410 | 4,090 | |
| At 2,300° F³ | 1,890 | 2,470 | 2,210 | 750 | 1,940 |
| At 2,700° F³ | 1,870 | 2,020 | 730 | 180 | 1,290 |
| Calculated CaO:SiO₂ ratio | 1.94 | 1.77 | 1.62 | 1.26 | 1.68 |

The lime:silica ratio exclusive of the lime tied up as calcium metazirconate was approximately calculated by use of the following formula:

$$\text{Ratio} = \frac{C - 0.31Z}{S + 0.33Z}$$

Where:

C = weight percent CaO in magnesite grain.
S = weight percent SiO₂ in magnesite grain.
Z = weight percent zircon added.

Brick according to Examples I and II are according to the teachings of this invention. They have improved hot strength as tested by modulus of rupture (due to better sintering during manufacture). Example II is the best mode now known for practicing this invention.

While the principles of this invention are not completely understood, it is believed that by adding an appropriate amount of zircon to the brickmaking batch chemical non-equilibrium promotes solid-state sintering. It is possible that small amounts of liquid are present for short times during the burn but, primarily, the sintering is a solid-state process.

In Examples I to IV, the zircon reacted during the burn with the lime present to form calcium-metazirconate and silica. The silica in turn reacted with the remaining lime and silica in grain to form various magnesium-calcium-silicate phases. In brick according to Example I, the primary silicate phase (determined by X-ray diffraction methods) was dicalcium silicate. The primary phase in brick according to Example II was a solid-solution between dicalcium silicate and merwinite.

When brick according to this invention are to be used in the working lining of basic oxygen vessels, they are tar-impregnated. Impregnation is accomplished either by vacuum-impregnation or, simply, by immersing the burned brick in liquefied pitch generally heated to about 400° F. for about ½ hour. Commercially available tar pitch, of petroleum or coke base, can be used for this purpose. Generally, a coal-phase pitch having a softening point on the order of about 150° F. is used.

According to the provisions of the patent statues, we have explained to the best of our knowledge the principle of our invention, and have described what we now consider to represent the best embodiment or mode. However, we desire to have it understood that, within the scope of the pending claims, the invention may be practiced otherwise than that specifically described.

Having thus described the invention in detail and with sufficient particularity as to enable those skilled in the art to practice, it what is desired to have protected by Letters Patent set forth in the following claims:

We claim:

1. The method of making burned magnesite brick containing calcium metazirconate comprising the steps of:
    (a) forming a size graded batch of
        (i) dead burned magnesite having a lime:silica weight ratio between 2:1 and 5:1,
        (ii) at least 0.5% and less than 5%, by weight, of finely divided zircon, the lime:silica weight ratio of the batch excluding the lime that will be tied up as metazirconate being between 2:1 and 1.6:1, the batch analyzing less than 3.0% $R_2O_3$ oxides, less than 0.5% $Al_2O_3$, less than 0.5% $TiO_2$, less than 0.05% $B_2O_3$, and at least 90% MgO;
    (b) tempering the batch;
    (c) forming the tempered batch into brick;
    (d) drying the brick; and
    (e) firing at temperatures in excess of 2800° F.

2. The method according to claim 1 in which the fired brick are tar-impregnated.

3. The method of claim 1 in which the finely divided zircon comprises at least 1% of the batch.

4. The method of claim 1 in which the fired brick have a matrix phase comprising a solid-solution of dicalcium silicate and merwinite.

5. The method of claim 1 in which the batch excluding the lime that will be tied up as metazirconate has a CaO:SiO₂ weight ratio between 1.7:1 and 1.8:1.

References Cited

UNITED STATES PATENTS 3,192,059  6/1965  Good et al. _____ 106—57

JAMES E. POER, Primary Examiner

U.S. Cl. X.R.

106—58